United States Patent
Grant et al.

(10) Patent No.: US 11,048,500 B2
(45) Date of Patent: Jun. 29, 2021

(54) USER COMPETENCY BASED CHANGE CONTROL

(71) Applicant: International Business Machines Corporation, Armonk, NY (US)

(72) Inventors: Robert Huntington Grant, Atlanta, GA (US); Zachary A. Silverstein, Austin, TX (US); Shikhar Kwatra, Durham, NC (US); Amanda Nicole Wilk, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 63 days.

(21) Appl. No.: 16/507,486

(22) Filed: Jul. 10, 2019

(65) Prior Publication Data

US 2021/0011712 A1    Jan. 14, 2021

(51) Int. Cl.
*G06F 8/71*     (2018.01)
*G06Q 10/10*    (2012.01)
*G06F 11/36*    (2006.01)
*G06F 8/77*     (2018.01)

(52) U.S. Cl.
CPC .......... *G06F 8/71* (2013.01); *G06F 8/77* (2013.01); *G06F 11/3616* (2013.01); *G06Q 10/101* (2013.01)

(58) Field of Classification Search
CPC ..... G06F 8/70; G06F 8/71; G06F 8/77; G06F 11/3616; G06Q 10/101
USPC .................................................. 717/120–122
See application file for complete search history.

(56) References Cited

U.S. PATENT DOCUMENTS

| | | | |
|---|---|---|---|
| 5,907,705 A | 5/1999 | Carter | |
| 7,644,144 B1 | 1/2010 | Horvitz et al. | |
| 8,782,782 B1 | 7/2014 | Dicovitsky et al. | |
| 9,158,658 B2 | 10/2015 | Bigwood et al. | |
| 9,432,375 B2 | 8/2016 | Cheng et al. | |
| 9,785,432 B1 * | 10/2017 | Wright | G06Q 10/06398 |

(Continued)

OTHER PUBLICATIONS

Fritz, T., et al., Degree-of-Knowledge: Modeling a Developer's Knowledge of Code, ACM Transactions on Software Engineering and Methodology, Apr. 2014, 42 pages, [retrieved on Feb. 16, 2021], Retrieved from the Internet: <URL:http://dl.acm.org/>.*

(Continued)

*Primary Examiner* — Geoffrey R St Leger
(74) *Attorney, Agent, or Firm* — Garg Law Firm, PLLC; Rakesh Garg; Brian Restauro

(57) ABSTRACT

A change to a collaborative data repository made by a developer is detected. Using an analysis of the change, a change score corresponding to the change is computed, wherein the analysis comprises determining a complexity score of the change, a writing quality score of the change, a value score of the change, and a criticality score of the change. Using an analysis of the developer, a first developer score is computed, wherein the analysis comprises determining a role score of the developer and a history score corresponding to a previous change of the developer. Based on the change score and the first developer score, a restriction on implementing the first change is enforced. A result of the change and the restriction is detected. Based on the result, the change score, and the first developer score, a second developer score is generated.

20 Claims, 10 Drawing Sheets

(56) References Cited

U.S. PATENT DOCUMENTS

| | | | |
|---|---|---|---|
| 2003/0115570 A1 | 6/2003 | Bisceglia | |
| 2003/0192029 A1* | 10/2003 | Hughes | G06Q 10/06311 717/101 |
| 2007/0168946 A1* | 7/2007 | Drissi | G06F 8/71 717/110 |
| 2009/0070734 A1* | 3/2009 | Dixon | G06F 8/71 717/102 |
| 2009/0210799 A1 | 8/2009 | Reiser et al. | |
| 2013/0080919 A1 | 3/2013 | Kiang et al. | |
| 2018/0025148 A1 | 1/2018 | Jain et al. | |
| 2018/0129483 A1* | 5/2018 | Biddle | G06Q 10/06 |
| 2019/0227793 A1* | 7/2019 | Ramasamy | G06Q 10/06398 |

OTHER PUBLICATIONS

De Moura, M., et al., Extracting new metrics from Version Control System for the comparison of software developers, 2014 Brazilian Symposium on Software Engineering, Sep. 28-Oct. 3, 2014, pp. 41-50, [retrieved on Feb. 16, 2021], Retrieved from the Internet: <URL: http://ieeexplore.ieee.org/>.*

Bhatti, H. R., Automatic Measurement of Source Code Complexity, Master's Thesis, Luleå University of Technology, 93 pages, Jan. 2010, [retrieved on Feb. 16, 2021], Retrieved from the Internet: <URL:https://www.diva-portal.org/smash/get/diva2:1019963/FULLTEXT02>.*

Gousios et al., "Measuring developer contribution from software repository data," Proceedings of the 2008 international working conference on Mining software repositories (MSR '08). ACM, New York, NY, USA, 129-132.

Yan et al., "Profiling Developer Expertise across Software Communities with Heterogeneous Information Network Analysis," Proceedings of the Tenth Asia-Pacific Symposium on Internetware (Internetware '18). ACM, New York, NY, USA, Article 2, 9 pages.

Costa et al., Unveiling Developers Contributions Behind Code Commits: An Exploratory Study, 2014 ACM 978-1-4503-2469—Apr. 14, 2003, http://dx.doi.org/10.1145/2554850.2555030.

* cited by examiner

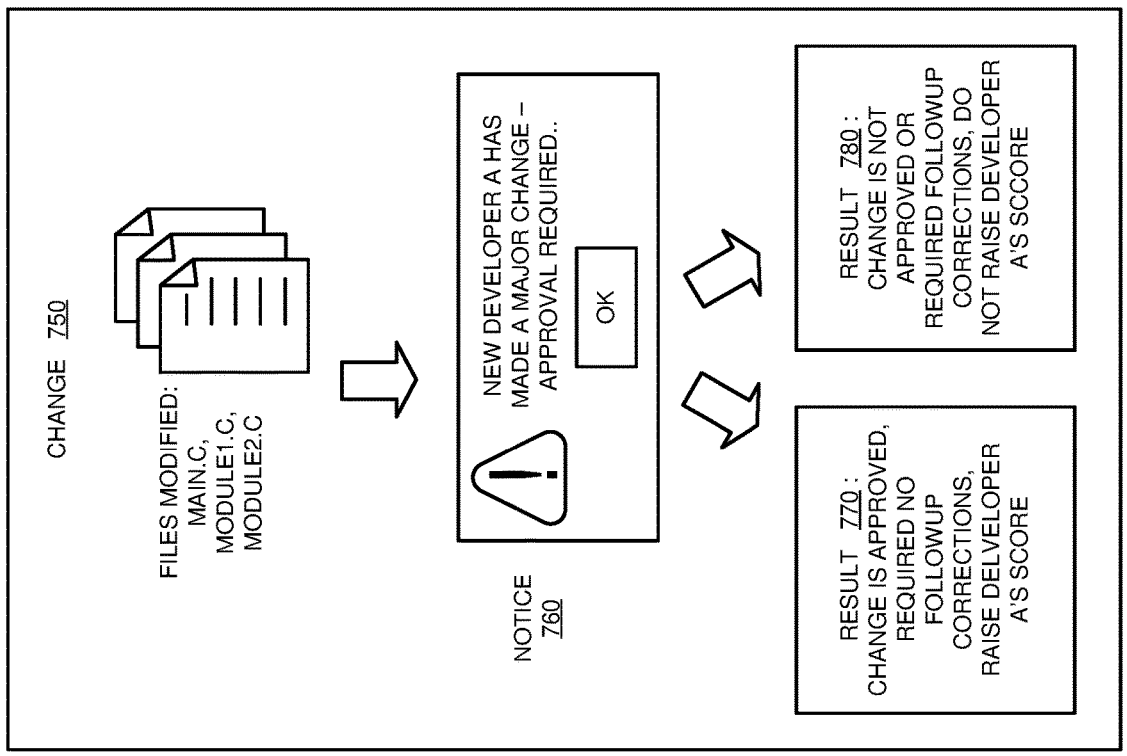
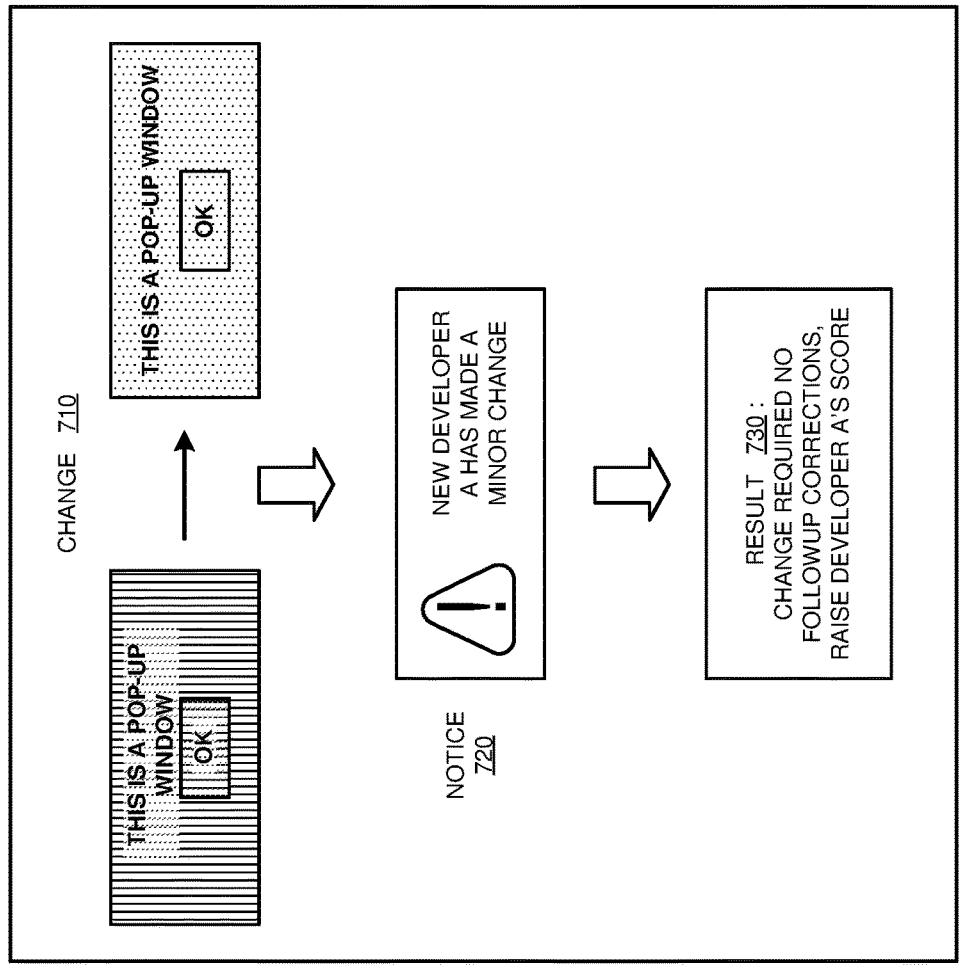
FIGURE 7

USER COMPETENCY BASED CHANGE CONTROL

TECHNICAL FIELD

The present invention relates generally to a method, system, and computer program product for controlling changes to a collaborative data repository. More particularly, the present invention relates to a method, system, and computer program product for user competency based change control.

BACKGROUND

A collaborative data repository holds data that many users can access. Typically, the data stored in a collaborative data repository is a large document or the source code of an application. In some configurations, all users are equally able to change the data in the repository. Other configurations enforce static restrictions, for example allowing only users working on a specific project, those with a particular assigned role (e.g. administrator or senior developer), or those with a minimum level of experience (either overall or with a particular subject to change the data.

SUMMARY

The illustrative embodiments provide a method, system, and computer program product. An embodiment includes a method that detects a first change to a collaborative data repository made by a first developer. An embodiment computes, using an analysis of the first change, a first change score corresponding to the change, wherein the analysis comprises determining a complexity score of the first change, a writing quality score of the first change, a value score of the first change, and a criticality score of the first change. An embodiment computes, using an analysis of the first developer, a first developer score, wherein the analysis comprises determining a role score of the first developer and a history score corresponding to a previous change of the first developer. An embodiment enforces, based on the first change score and the first developer score, a restriction on implementing the first change. An embodiment detects a result of the first change and the restriction. An embodiment generates, based on the result, the first change score, and the first developer score, a second developer score.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 7 depicts an example of user competency based change control in accordance with an illustrative embodiment;

DETAILED DESCRIPTION

Figure 1:
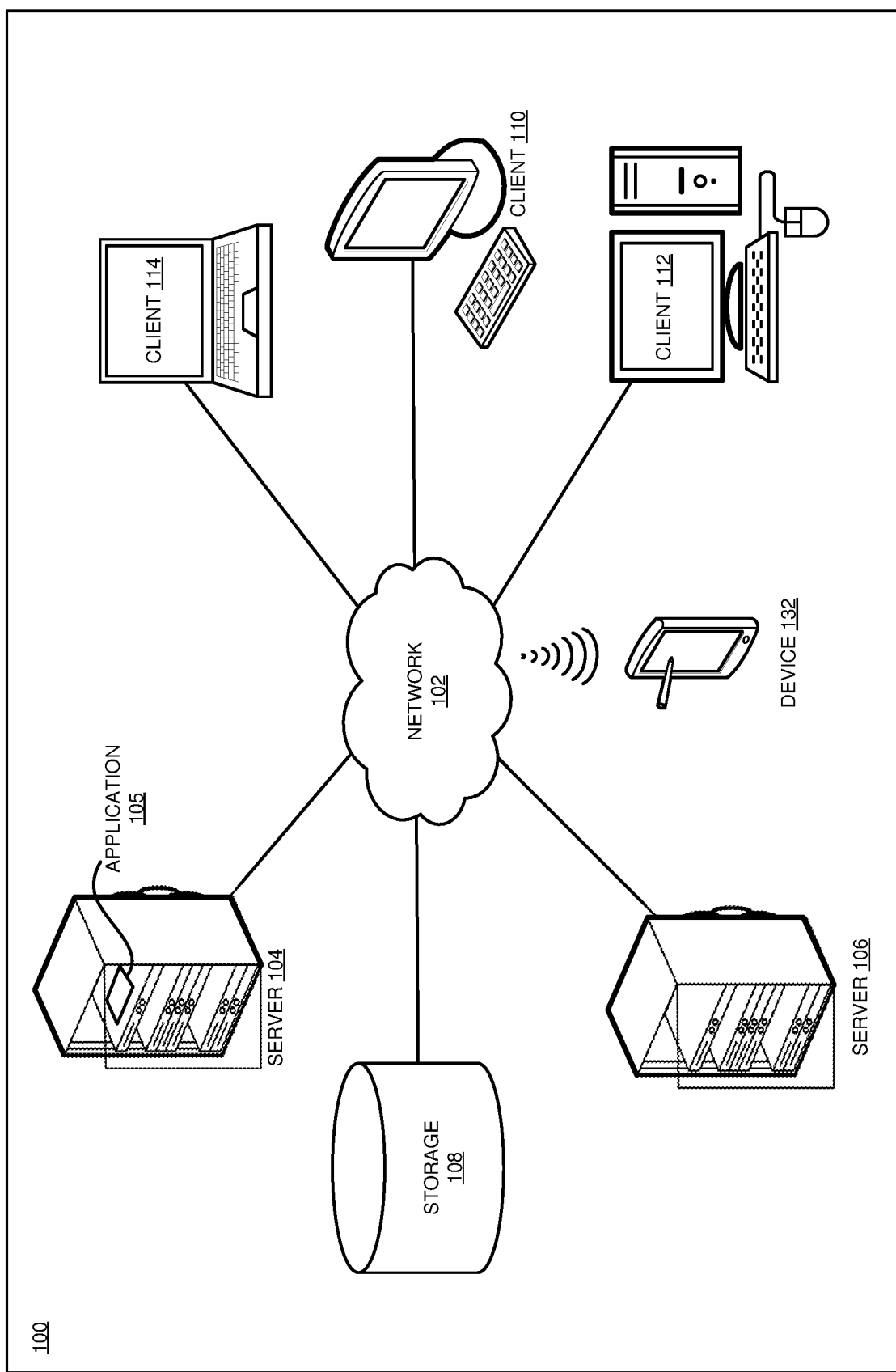
FIG. 1 depicts a block diagram of a network of data processing systems in which illustrative embodiments may be implemented.

The illustrative embodiments recognize that static restrictions on modifying data in a collaborative data repository may need to change over time. For example, a project-based restriction might require modification when a new developer joins a project team and requires modification access. Similarly, role or experience-based restrictions might require modification when a user assumes a new role or gains sufficient experience.

The illustrative embodiments also recognize that restrictions on modifying data in a collaborative data repository are often binary: either a user is allowed to modify data or he or she is not. However, a team may want to implement different classes of restrictions, based on the user, the modification being made, or both. For example, a team may want to allow new members to make only minor modifications, where a definition of a minor modification is determined by the team. However, more experienced members of this team are allowed to make non-minor modifications as well. As another example, a team may want to incorporate a modification review process, in which all modifications, or a subset of modifications, or modifications made by a subset of users, must be approved before being added to the repository.

Further, the illustrative embodiments recognize that different classes of restrictions should adapt to changing circumstances. For example, as a user gains familiarity with a project, restrictions on that user might need to be loosened or removed. However, if an experienced user makes a modification that requires extensive remedial modifications, restrictions on that user might need to be added or tightened. As another example, a team may realize that a particular type of modification should be recategorized, for example from minor to major, based on the team's experience with the consequences of an error involving that modification.

Consequently, the illustrative embodiments recognize that there is an unmet need for dynamic change control to a collaborative data repository that is based on both user competency and a category of change being made.

The illustrative embodiments recognize that the presently available tools or solutions do not address these needs or provide adequate solutions for these needs. The illustrative embodiments used to describe the invention generally address and solve the above-described problems and other problems related to user competency based change control.

An embodiment can be implemented as a software application. The application implementing an embodiment can be configured as a modification of an existing collaborative data repository change control system, as a separate application that operates in conjunction with an existing collaborative data repository change control system, a standalone application, or some combination thereof.

Particularly, some illustrative embodiments provide a method by which a change to a collaborative data repository is evaluated based on analyses of the change and the user making the change, and a modification restriction enforced based on the results of the analyses.

As used herein, a developer is a person or entity responsible for a modification to data in a collaborative data repository. An embodiment maintains a score of each developer who uses a repository. A developer's score includes two components: an evaluation of the developer's role and an evaluation of the developer's history of modifications to the repository.

To evaluate a developer's role, an embodiment combines one or more components into a role score. A role score, as used herein, measures a developer's expected expertise, without reference to a specific project. To combine the components once determined, an embodiment normalizes each component score to a common scale (e.g. 0-1), then computes a weighted average of the normalized scores. Other combination methods are also possible and contemplated within the scope of the illustrative embodiment.

One embodiment includes, as a role score component, a score corresponding to a developer's years of experience, either at his or her current employer or at all employers. Another embodiment includes, as a role score component, a score corresponding to a developer's job title. For example, a role score component for a developer with a job title of "summer intern" might be lower than a role score component for a developer with a job title of "senior developer". Another embodiment includes, as a role score component, a score corresponding to the breadth of a developer's access to or modification rights to portions of the repository. Such a breadth component relies on an assumption that a developer with access to more portions, or modification rights to more portions, has that access because he or she has greater expertise than a developer with access to fewer portions, or modification rights to fewer portions. For example, a junior developer may only be given access to one area of the repository, and his or her access expanded as he or she gains experience with the project stored in the repository. Other role score components are also possible and contemplated within the scope of the illustrative embodiments.

To evaluate a developer's history of modifications to the repository, an embodiment combines one or more components into a history score. A history score, as used herein, measures a value of a developer's history of modifications to a specific project within the repository. To combine the components once determined, an embodiment normalizes each component score to a common scale (e.g. 0-1), then computes a weighted average of the normalized scores. Other combination methods are also possible and contemplated within the scope of the illustrative embodiments.

One embodiment includes, as a history score component, a score corresponding to a size of a developer's contributions to a project. An embodiment measures a size of a developer's contributions to a text-based project by counting a number of words, characters, pages, or another text-based metric. An embodiment measures a size of a developer's contributions to a source code project by counting a number of lines of source code, number of source code files modified, or another source code based metric.

Another embodiment includes, as a history score component, a score corresponding to a frequency of a developer's contributions to a project, within a defined time period. Such a frequency component relies on an assumption that a developer who makes fewer modifications to a project within a time period, or fewer modifications to a specific portion of a project within a time period, is more careful than a developer who makes more modifications, or more modifications to a specific portion of a project. However, such a frequency component must be determined carefully, with reference to historical statistics for a project or similar projects, to avoid penalizing a developer who is simply more productive than another developer.

Another embodiment includes, as a history score component, a score corresponding to a quality metric of a developer's contributions to a project. To determine a quality metric, an embodiment can use any suitable existing technique. For example, tools are currently available to conduct defect and security vulnerability analyses in source code.

Another embodiment includes, as a history score component, a score corresponding to a complexity of a developer's contributions to a project. To score complexity, an embodiment can use any suitable existing technique. For example, tools are currently available to analyze complexity in text documents and source code. Another embodiment scores complexity based on a set of rules. For example, a set of rules can be used to relate a number of modified files, or a number of modified files of a particular type, to a complexity of a change to source code.

Another embodiment includes, as a history score component, a score corresponding to an ability of a developer to correct other developers' contributions to a project. To score correction ability, an embodiment analyzes modification sequences to portions of a project. A pattern of one developer modifying a portion of a project, followed within a designated time period by another developer modifying the same portion, indicates that the second developer is fixing a mistake made by the first developer. Another embodiment scores correction ability by referencing data of modifications that are denoted as fixing a specific defect involving an item in the repository. By referencing defect-fix data, an embodiment relies on an assumption that a developer who fixes more defects in a defined time period is more valuable to a project, and hence has a greater ability, than another developer who fixes fewer defects in the same time period. Other history score components are also possible and contemplated within the scope of the illustrative embodiments.

An embodiment evaluates a developer's role and history using data in an already-existing repository. An embodiment also periodically reevaluates a developer's role and history, to account for modifications to the repository. If an embodiment does not have access to data in an already-existing repository from which to evaluate a developer's role and history, for example because the developer is new to the repository or the repository does not yet have stored data, an embodiment initializes the developer's profile to a set of default values. In addition, because a developer's history score is project-specific, if a developer joins a new project, an embodiment assigns the developer a default history score. In one embodiment, the default history score is lowered a specific amount, or a specific percentage, from the developer's history score for another project, to take into account the transitioning developer's lack of experience with the new project.

An embodiment detects a modification to data in a collaborative data repository. An embodiment evaluates the modification based on one or more of the complexity of the change, the quality of the change, the value of the change, and the criticality of the change. The modification can include changing only one file or portion of the repository, or changing more than one file or portion. One embodiment detects the modification after the modification has been completed in the repository. Another embodiment intercepts and quarantines the modification before being completed in the repository.

To evaluate the complexity of the change to narrative text, an embodiment performs a complexity analysis, techniques for which are known. An embodiment evaluates the complexity of the change to source code by counting the number of lines of code changed or added in all files that are part of the change, or in a subset of files. In one embodiment, the subset of files includes all files that are considered critical files. One embodiment considers, as critical files, project files that are modified most often within a time period. Another embodiment considers, as critical files, files that are so designated during application configuration. Another embodiment, when counting lines, weights the number of lines differently for different languages of source code. For example, an embodiment might consider one hundred changed lines in a Cascading Style Sheets (CSS, a style sheet language used for describing the presentation of a document) file to be the equivalent of twenty changed lines in a file containing code in the Java language, because Java code affects how a project works while CSS affects only a project's presentation.

To evaluate the quality of the change to narrative text, an embodiment performs a text quality analysis, techniques for which are known. An embodiment evaluates the quality of the change to source code by counting a number of warnings generated when compiling source code or checking source code for conformity with coding standards, by using natural language processing to evaluate a number or quality of comments within the source code, or by using other known techniques for source code quality analysis.

To evaluate the value of the change to an overall project, an embodiment considers frequently changed portions of a project to be correspondingly more valuable to the project than project portions that are rarely changed. Thus, an embodiment evaluates a frequency of modification for a portion of narrative text, or a source code component, then normalizes the frequency into a value score.

To evaluate the criticality of the change to an overall project involving narrative text, an embodiment classifies the change into a type, then uses a set of rules that relates each type to a value score. Two example types are cosmetic and functional. For example, a cosmetic change to narrative text might be a change to a font in a document. An example cosmetic change to source code might be a change to a user-interface element. An example functional change to narrative text might be an addition of a new document section, while an example functional change to source code might be an addition of a new capability.

An embodiment generates a score corresponding to one or more of the significance, quality, value, and criticality of the change, normalizes each score to a common scale (e.g. 0-1), then computes a weighted average of the normalized scores into a change score. Other combination methods are also possible and contemplated within the scope of the illustrative embodiments.

Based on the change score and the score of the developer making the change, an embodiment enforces one or more restrictions on implementing the change. An embodiment classifies the change score into a set of categories, delineated by thresholds. An embodiment classifies the developer score into another set of categories, also delineated by thresholds. One embodiment includes three developer score categories (e.g. new, mid-level, and experienced), although more or fewer categories are also possible and contemplated by the illustrative embodiments. One embodiment includes two change score categories (e.g. minor and major), although more or fewer categories are also possible and contemplated by the illustrative embodiments. Thus, an embodiment enforces one or more restrictions on implementing the change based on the combination of change category and developer category, As a developer improves in category, restrictions become generally less strict, because a more experienced developer has shown that he or she can make changes without causing a need for additional modifications.

If the change is in the lowest category (e.g. minor) and the developer is also in the lowest category (e.g. new), an embodiment implements a low level of restriction. The low level of restriction can include actions such as notifying a more experienced developer of the change and flagging portions of the repository affected by the change for additional monitoring.

If the change is in the highest category (e.g. major) and the developer is in the lowest category (e.g. new), an embodiment implements a high level of restriction. The high level of restriction can include actions such as preventing the change from being implemented or requiring a more experienced developer's approval of the change before the repository is actually modified. In addition, if the change affects source code, a high level of restriction can include performing additional diagnostic monitoring or collecting additional information to assist in reversing the change if necessary. As well, other forms of restriction are also possible and contemplated within the scope of the illustrative embodiments.

If the change is in an intermediate category between the highest category and the lowest category and the developer is in the lowest category (e.g. new), an embodiment implements an intermediate level of restriction. An intermediate level of restriction can include elements of a high level or low level of restriction, as configured for a particular implementation of an embodiment.

If the developer is not in the lowest category, an embodiment implements restrictions that are appropriate to the category of the developer. In particular, if a developer is a category higher than a threshold category, and the change is in the lowest category, an embodiment does not implement restrictions. If a developer is the highest category, and the change is in the highest category, an embodiment implements a low level of restriction in a manner described herein. If a developer or a change is in an intermediate category, an embodiment implements a low or medium level of restriction in a manner described herein.

An embodiment detects a result of the change and any restrictions on implementing the change. Based on the result, an embodiment updates the history component of the change developer's score in a manner described herein. Thus, if a lowest-category developer's changes produce continued positive results, an embodiment eventually adjusts the developer's category higher. Similarly, if a higher-category developer's changes produce a set of negative results, an embodiment eventually adjusts the developer's category lower. In addition, an embodiment flags such category changes, allowing for feedback to the affected developer.

The manner of user competency based change control described herein is unavailable in the presently available methods in the technological field of endeavor pertaining to change management for a collaborative data repository. A method of an embodiment described herein, when implemented to execute on a device or data processing system, comprises substantial advancement of the functionality of that device or data processing system in implementing user competency based change control.

The illustrative embodiments are described with respect to certain types of categories, changes, scores, analyses, data stored in a collaborative data repository, time periods, thresholds, adjustments, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
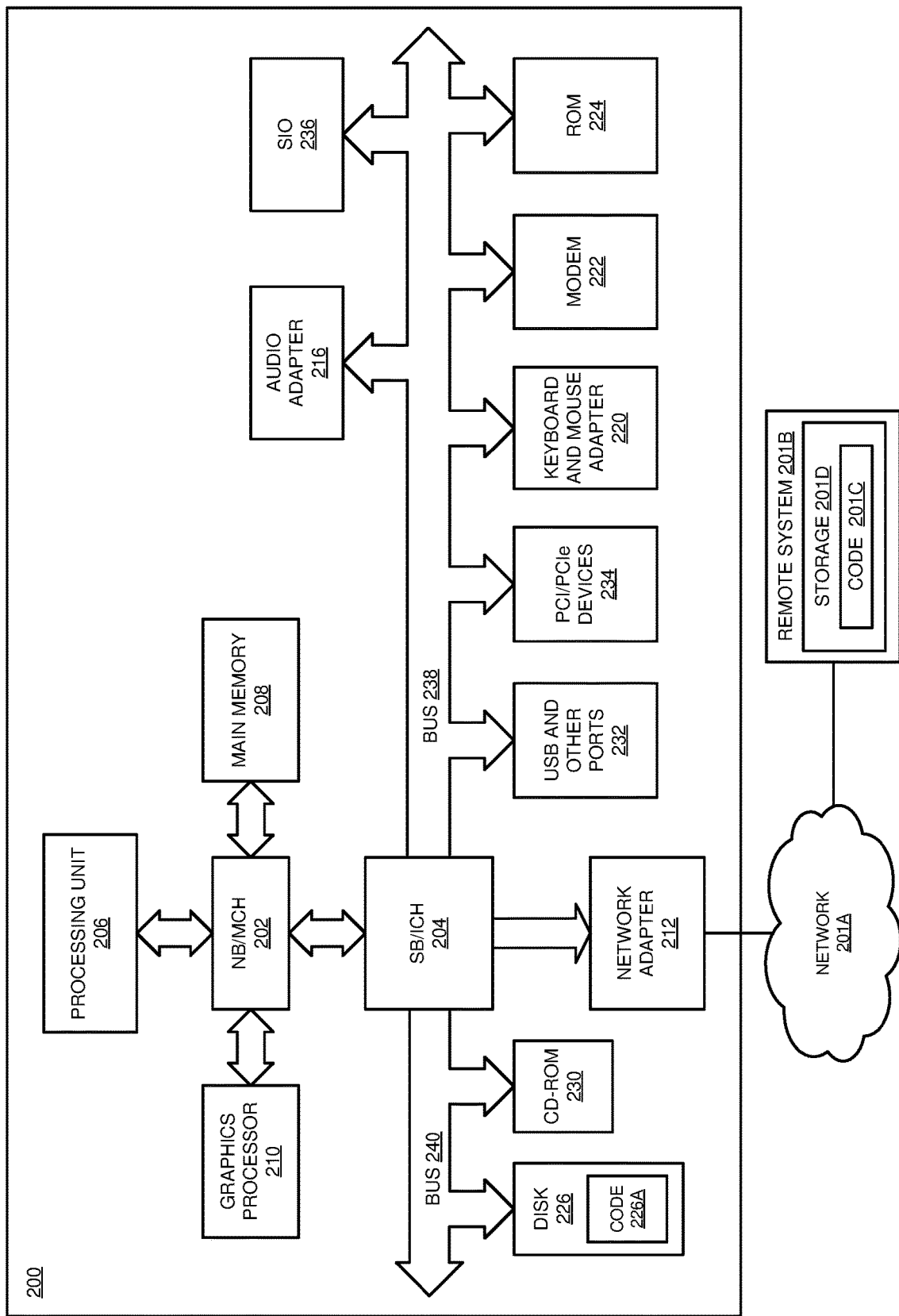
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 can execute in any of servers 104 and 106, clients 110, 112, 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2.

In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
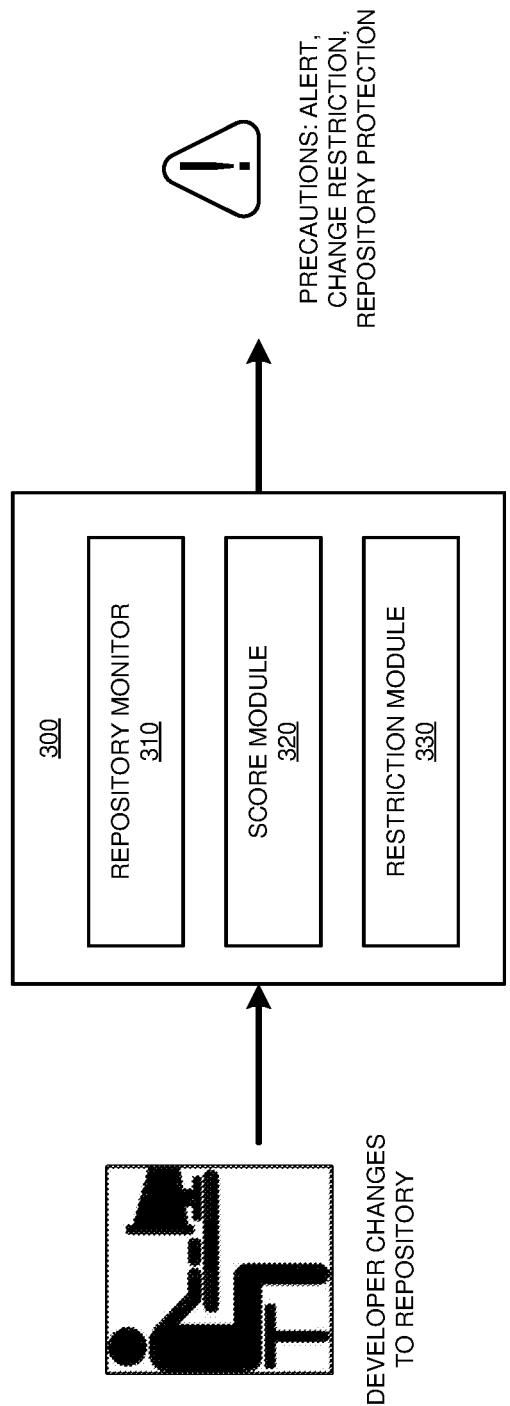
FIG. 3 depicts a block diagram of an example configuration for user competency based change control in accordance with an illustrative embodiment.

With reference to FIG. 3, this figure depicts a block diagram of an example configuration for user competency based change control in accordance with an illustrative embodiment. Application 300 is an example of application 105 in FIG. 1 and executes in any of servers 104 and 106, clients 110, 112, 114, and device 132 in FIG. 1.

Repository monitor 310 detects a modification to data in a collaborative data repository. Score module 320 evaluates the modification based on one or more of the complexity of the change, the quality of the change, the value of the change, and the criticality of the change. Score module 320 also evaluates a developer's role and history using data in the repository.

Based on the results determined in module 320, restriction module 330 enforces one or more restrictions on implementing the change. In particular, module 330 classifies the change score into a set of categories, delineated by thresholds, and classifies the developer score into another set of categories, also delineated by thresholds. One implementation of module 330 One embodiment includes three developer score categories (new, mid-level, and experienced) and two change score categories (minor and major). Thus, module 330 enforces one or more restrictions on implementing the change based on the combination of change category and developer category, As a developer improves in category, restrictions become generally less strict, because a more experienced developer has shown that he or she can make changes without causing a need for additional modifications.

Figure 4:
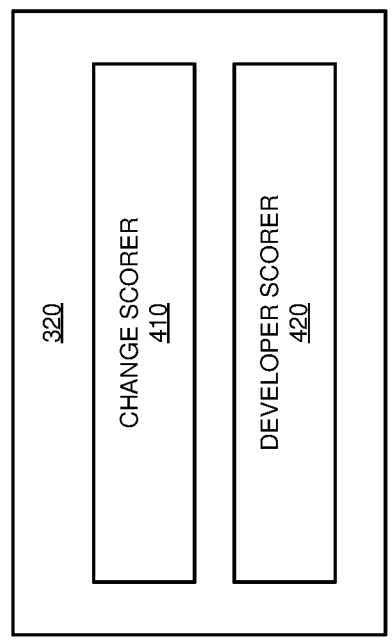
FIG. 4 depicts another block diagram of an example configuration for user competency based change control in accordance with an illustrative embodiment.

With reference to FIG. 4, this figure depicts another block diagram of an example configuration for user competency based change control in accordance with an illustrative embodiment. FIG. 4 depicts more detail of block 320 in FIG. 3.

Change scorer 410 evaluates the modification based on one or more of the complexity of the change, the quality of the change, the value of the change, and the criticality of the change. Developer scorer 420 evaluates a developer's role and history using data in the repository.

Figure 5:
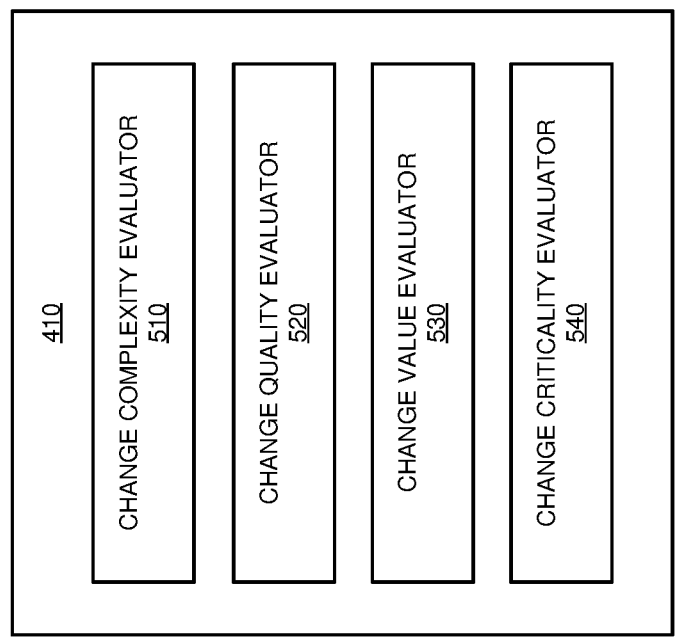
FIG. 5 depicts another block diagram of an example configuration for user competency based change control in accordance with an illustrative embodiment.

With reference to FIG. 5, this figure depicts another block diagram of an example configuration for user competency based change control in accordance with an illustrative embodiment. FIG. 5 depicts more detail of block 410 in FIG. 4.

To evaluate the complexity of a change to narrative text, change complexity evaluator 510 performs a complexity analysis using a suitable technique. Module 510 evaluates the complexity of a change to source code by counting the number of lines of code changed or added in all files that are part of the change, or in a subset of files. In one implementation, the subset of files includes all files that are considered critical files. One implementation of module 510 considers, as critical files, project files that are modified most often within a time period. Another implementation considers, as critical files, files that are so designated during application configuration. Another implementation, when counting lines, weights the number of lines differently for different languages of source code.

To evaluate the quality of the change to narrative text, change quality evaluator 520 performs a text quality analysis using a suitable technique. Module 520 evaluates the quality of the change to source code by counting a number of warnings generated when compiling source code or checking source code for conformity with coding standards, by using natural language processing to evaluate a number or quality of comments within the source code, or by using other known techniques for source code quality analysis.

To evaluate the value of the change to an overall project, change value evaluator 530 considers frequently changed portions of a project to be correspondingly more valuable to the project than project portions that are rarely changed. Thus, module 530 evaluates a frequency of modification for a portion of narrative text, or a source code component, then normalizes the frequency into a value score.

To evaluate the criticality of the change to an overall project involving narrative text, change criticality evaluator 540 classifies the change into a type (e.g. cosmetic or functional), then uses a set of rules that relates each type to a value score. Two example types are cosmetic and functional.

Figure 6:
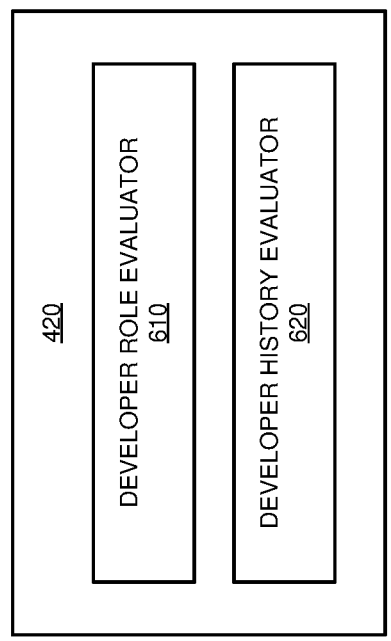
FIG. 6 depicts another block diagram of an example configuration for user competency based change control in accordance with an illustrative embodiment.

With reference to FIG. 6, this figure depicts another block diagram of an example configuration for user competency based change control in accordance with an illustrative embodiment. FIG. 6 depicts more detail of block 420 in FIG. 4.

To evaluate a developer's role, developer role evaluator 610 combines one or more components into a role score, by normalizing each component score to a common scale (e.g. 0-1) and then computing a weighted average of the normalized scores. One role score component is a score corresponding to a developer's years of experience, either at his or her current employer or at all employers. Another role score component is a score corresponding to a developer's job title. Another role score component is a score corresponding to the breadth of a developer's access to or modification rights to portions of the repository.

To evaluate a developer's history of modifications to the repository, developer history evaluator 620 combines one or more components into a history score, by normalizing each component score to a common scale (e.g. 0-1) and then computing a weighted average of the normalized scores. One history score component is a score corresponding to a size of a developer's contributions to a project. Another history score component is a score corresponding to a frequency of a developer's contributions to a project, within a defined time period. history score component is a score corresponding to a quality metric of a developer's contributions to a project. Another history score component is a score corresponding to a complexity of a developer's contributions to a project. Another history score component is a score corresponding to an ability of a developer to correct other developers' contributions to a project.

With reference to FIG. 7, this figure depicts an example of user competency based change control in accordance with an illustrative embodiment. The example can be executed using application 300 in FIG. 3.

Change 710 depicts an example cosmetic change—modifying the background of a pop-up window in an application for which source code is stored in a collaborative data repository—performed by Developer A. Application 300 detects change 710. Based on one or more of the complexity of the change, the quality of the change, the value of the change, and the criticality of the change, application 300 classifies change 710 into the "minor" category (the lowest). Application 300 has also evaluated role and history scores for Developer A, and classified Developer A into the "new" category (the lowest). Thus, because both the change and the developer are in the lowest category, application 300 generates notice 720, notifying a more experienced developer of the change. application 300 also flags portions of the repository affected by change 710 for additional monitoring. Thus, change 710 results in result 730: because change 710 did not require any follow-up corrections, Developer A's score can be raised.

Change 750 depicts an example major change—modifying critical source files for an application for which source code is stored in a collaborative data repository—also performed by Developer A. Application 300 detects change 750. Based on one or more of the complexity of the change, the quality of the change, the value of the change, and the criticality of the change, application 300 classifies change 750 into the "major" category (the highest). Thus, because the change is in the highest category and the developer are in the lowest category, application 300 generates notice 760, notifying a more experienced developer of the change and requiring the more experienced developer's approval before implementing change 750. Application 300 also flags portions of the repository affected by change 750 for additional monitoring. Thus, change 750 can result in result 770: change 750 is approved for implementation, and did not require any follow-up corrections, so Developer A's score can be raised. However, change 750 can also result in result 780, in which the change was not approved or required follow-up corrections. Thus, in this case Developer A's score is not raised.

Figure 8:
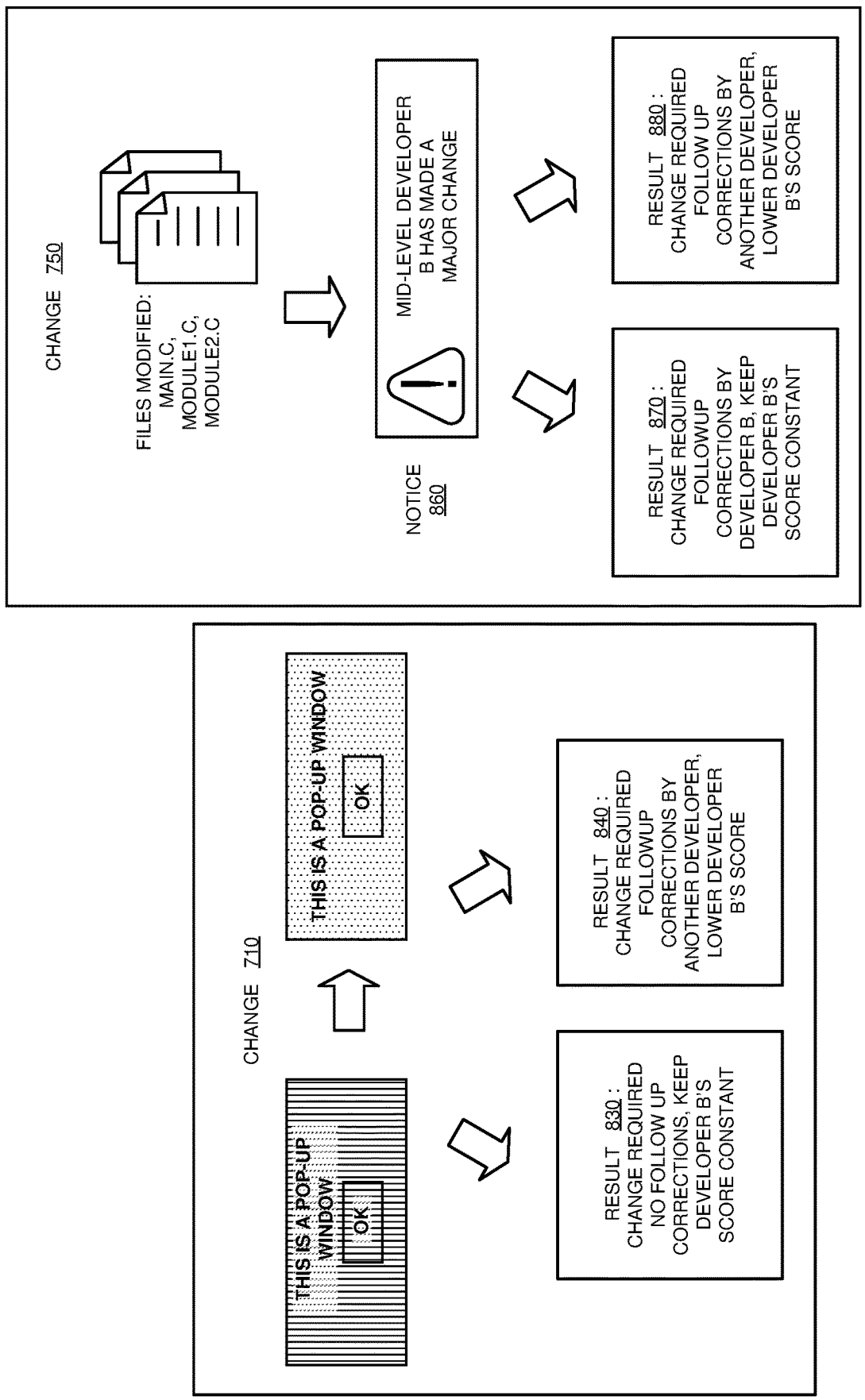
FIG. 8 depicts another example of user competency based change control in accordance with an illustrative embodiment.

With reference to FIG. 8, this figure depicts another example of user competency based change control in accordance with an illustrative embodiment. The example can be executed using application 300 in FIG. 3. Changes 710 and 750 are the same as changes 710 and 750 in FIG. 7.

Here, change 710 remains in the "minor" category (the lowest). However, change 710 has been made by Developer B. Application 300 has evaluated role and history scores for Developer B, and classified Developer B into the "mid-level" category (intermediate). Thus, because the change is in the lowest category and the developer is not in the lowest category, change 710 can result in result 830: change 710 did not require any follow-up corrections, so Developer B's score can be kept constant. However, change 710 can also result in result 840, in which the change did require follow-up corrections by another developer. Thus, in this case Developer B's score can be lowered, because Developer B should have been experienced enough to implement a cosmetic change without additional corrections.

Change 750 remains in the "major" category (the highest). However, because Developer B is in the "mid-level" category, application 300 generates notice 860, notifying a more experienced developer of the change. Application 300 also flags portions of the repository affected by change 750 for additional monitoring. Thus, change 750 can result in result 870: change 750 required follow-up corrections by Developer B. Because Developer B is at a level where he or she is expected to perform follow-up corrections for a major change, Developer B's score remains constant. However, change 750 can also result in result 880, in which change 750 required follow-up corrections by another developer. Because such corrections are not expected, Developer B's score is lowered.

Figure 9:
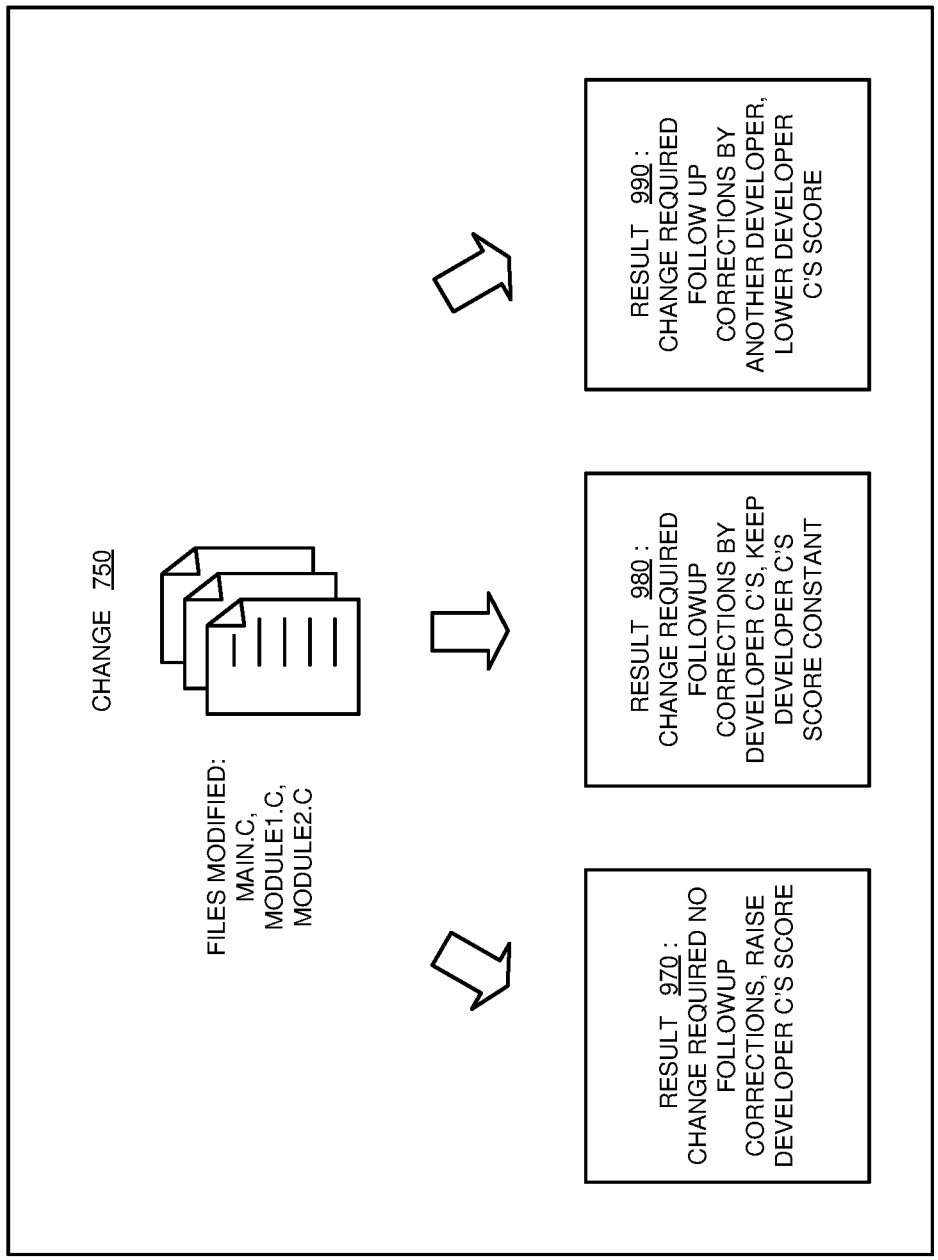
FIG. 9 depicts another example of user competency based change control in accordance with an illustrative embodiment.

With reference to FIG. 9, this figure depicts another example of user competency based change control in accordance with an illustrative embodiment. The example can be executed using application 300 in FIG. 3. Change 750 is the same as change 750 in FIG. 7.

Change 750 remains in the "major" category (the highest). However, here change 750 has been made by Developer C, who is the highest category. Thus, three results of change 750 are possible. In result 970, change 750 required no follow-up corrections. Thus, because Developer C performed a major change without errors the application raises Developer's C score. In result 980, change 750 required Developer C to make follow-up corrections. Because Developer C is at a level where he or she is expected to perform follow-up corrections for a major change, Developer C's score remains constant. However, change 750 can also result in result 990, in which change 750 required follow-up corrections by another developer. Because such corrections are not expected, Developer C's score is lowered.

Figure 10:
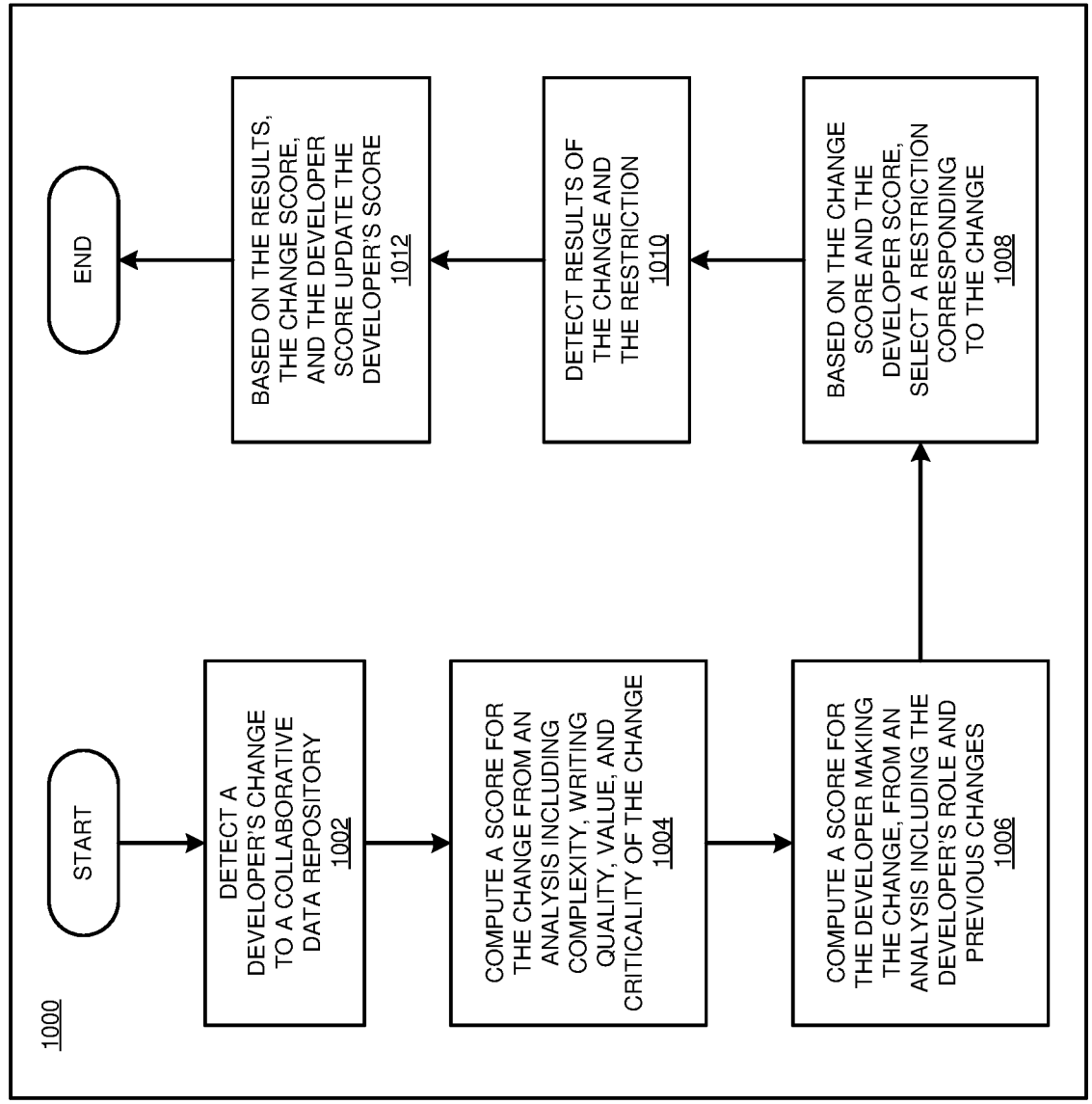
FIG. 10 depicts a flowchart of an example process for user competency based change control in accordance with an illustrative embodiment.

With reference to FIG. 10, this figure depicts a flowchart of an example process for user competency based change control in accordance with an illustrative embodiment. Process 1000 can be implemented in application 300 in FIG. 3.

In block 1002, the application detects a developer's change to a collaborative data repository. In block 1004, the application computes a score for the change from an analysis including complexity, writing quality, value, and criticality of the change. In block 1006, the application computes a score for the developer making the change, from an analysis including the developer's role and previous changes. In block 1008, the application, based on the change score and the developer score, selects a restriction corresponding to the change. In block 1010, the application detects results of the change and the restriction. In block 1012, the application, based on the results, the change score, and the developer score, updates the developer's score. Then the application ends.

Thus, a computer implemented method, system or apparatus, and computer program product are provided in the illustrative embodiments for user competency based change control and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   detecting a first change to data within a collaborative data repository;
   computing, using an analysis of the first change, a first change score corresponding to the first change, wherein the analysis comprises determining a complexity score of the first change, a writing quality score of the first change, a value score of the first change, and a criticality score of the first change;
   computing, using an analysis of stored data corresponding to a developer identified as responsible for the first change, a first developer score, wherein the analysis comprises executing at least one score computation algorithm to output a role score of the developer and a history score based on an input comprising a previous change of the developer, the history score comprising a scored correction ability of the developer determined using a detected pattern within a set of modification sequences to the collaborative data repository;
   automatically configuring, based on the first change score and the first developer score, the collaborative data repository to enforce a restriction on implementing the first change, the configuring comprising activating monitoring of a portion of the collaborative data repository affected by the first change;
   detecting, by automatically monitoring the portion, a result of the first change and the restriction, the result comprising a second change to data within the collaborative data repository; and
   automatically updating, based on the result and the first change score, the first developer score.

2. The computer-implemented method of claim 1, wherein the history score comprises a score corresponding to a volume of a previous change of the developer to a project maintained in the repository.

3. The computer-implemented method of claim 1, wherein the history score comprises a score corresponding to a frequency of a set of previous changes of the developer to a project maintained in the repository.

4. The computer-implemented method of claim 1, wherein the history score comprises a score corresponding to a quality metric of a set of previous changes of the developer to a project maintained in the repository.

5. The computer-implemented method of claim 1, wherein the history score comprises a score corresponding to a complexity metric of a set of previous changes of the developer to a project maintained in the repository.

6. The computer-implemented method of claim 1, wherein the collaborative data repository stores source code of an application.

7. The computer-implemented method of claim 6, wherein the complexity score of the first change comprises a score corresponding to a number of lines of source code of the first change.

8. The computer-implemented method of claim 6, wherein the complexity score of the first change comprises a score corresponding to a number of lines of source code of critical files within the first change.

9. The computer-implemented method of claim 6, wherein the writing quality score of the first change comprises a score corresponding to a number of error results of a source code quality checking tool evaluation of the first change.

10. The computer-implemented method of claim 6, wherein the value score of the first change comprises a score corresponding to a frequency of modification of files of the first change.

11. The computer-implemented method of claim 6, wherein the criticality score of the first change comprises a score corresponding to classification of a type of the first change.

12. A computer usable program product comprising one or more computer-readable storage devices, and program instructions stored on at least one of the one or more storage devices, the stored program instructions comprising:
   program instructions to detect a first change to data within a collaborative data repository;
   program instructions to compute, using an analysis of the first change, a first change score corresponding to the first change, wherein the analysis comprises determining a complexity score of the first change, a writing quality score of the first change, a value score of the first change, and a criticality score of the first change;
   program instructions to compute, using an analysis of stored data corresponding to a developer identified as responsible for the first change, a first developer score, wherein the analysis comprises executing at least one score computation algorithm to output a role score of the developer and a history score based on an input comprising a previous change of the developer, the history score comprising a scored correction ability of the developer determined using a detected pattern within a set of modification sequences to the collaborative data repository;
   program instructions to automatically configure, based on the first change score and the first developer score, the collaborative data repository to enforce a restriction on implementing the first change, the configuring comprising activating monitoring of a portion of the repository affected by the first change;
   program instructions to detect, by automatically monitoring the portion, a result of the first change and the restriction, the result comprising a second change to data within the collaborative data repository; and
   program instructions to automatically update, based on the result and the first change score, the first developer score.

13. The computer usable program product of claim 12, wherein the history score comprises a score corresponding to a volume of a previous change of the developer to a project maintained in the repository.

14. The computer usable program product of claim 12, wherein the history score comprises a score corresponding to a frequency of a set of previous changes of the developer to a project maintained in the repository.

15. The computer usable program product of claim 12, wherein the history score comprises a score corresponding to a quality metric of a set of previous changes of the developer to a project maintained in the repository.

16. The computer usable program product of claim 12, wherein the history score comprises a score corresponding to a complexity metric of a set of previous changes of the developer to a project maintained in the repository.

17. The computer usable program product of claim 12, wherein the collaborative data repository stores source code of an application.

18. The computer usable program product of claim 12, wherein the computer usable code is stored in a computer readable storage device in a data processing system, and wherein the computer usable code is transferred over a network from a remote data processing system.

19. The computer usable program product of claim 12, wherein the computer usable code is stored in a computer readable storage device in a server data processing system, and wherein the computer usable code is downloaded over a network to a remote data processing system for use in a computer readable storage device associated with the remote data processing system.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to detect a first change to data within a collaborative data repository;

program instructions to compute, using an analysis of the first change, a first change score corresponding to the first change, wherein the analysis comprises determining a complexity score of the first change, a writing quality score of the first change, a value score of the first change, and a criticality score of the first change;

program instructions to compute, using an analysis of stored data corresponding to a developer identified as responsible for the first change, a first developer score, wherein the analysis comprises executing at least one score computation algorithm to output a role score of the developer and a history score based on an input comprising a previous change of the developer, the history score comprising a scored correction ability of the developer determined using a detected pattern within a set of modification sequences to the collaborative data repository;

program instructions to automatically configure, based on the first change score and the first developer score, the collaborative data repository to enforce a restriction on implementing the first change, the configuring comprising activating monitoring of a portion of the repository affected by the first change;

program instructions to detect, by automatically monitoring the portion, a result of the first change and the restriction, the result comprising a second change to data within the collaborative data repository; and program instructions to automatically update, based on the result and the first change score, the first developer score.

* * * * *